June 26, 1934.  J. P. SPANG  1,964,090
MEAT SLITTING MACHINE
Filed Jan. 11, 1932  3 Sheets-Sheet 1

Inventor.
Joseph P. Spang
by Heard Smith & Tennant.
Attys.

June 26, 1934. J. P. SPANG 1,964,090
MEAT SLITTING MACHINE
Filed Jan. 11, 1932   3 Sheets-Sheet 2

Inventor.
Joseph P. Spang
by Heard Smith & Tennant.
Attys.

June 26, 1934.  J. P. SPANG  1,964,090
MEAT SLITTING MACHINE
Filed Jan. 11, 1932  3 Sheets-Sheet 3

Inventor.
Joseph P. Spang
by Heard Smith & Tennant
Attys.

Patented June 26, 1934

1,964,090

UNITED STATES PATENT OFFICE 1,964,090

MEAT-SLITTING MACHINE

Joseph P. Spang, Quincy, Mass.

Application January 11, 1932, Serial No. 585,896

5 Claims. (Cl. 17—26)

This invention relates to machines for slitting meat in such a way as to provide therein slits which cross each other thereby increasing the cooking surface of the meat.

One of the objects of the invention is to provide a novel meat-slitting machine by which the desired crossing or intersecting slits may be made during a single pass of the meat through the machine thereby obviating the time and labor required in making two passes across the meat with the knives in order to obtain the crossing slits, as is necessary with many meat-slitting machines that are now in use.

A further object of the invention is to provide a novel meat-slitting machine in which the two series of crossing slits have a sinuous shape.

A still further object of the invention is to provide a meat-slitting machine with novel means for stripping the meat from the knives as the slits are cut so as to avoid the meat sticking to the knives.

Another object of the invention is to provide an improved machine constructed so as to produce slits on both sides of a piece of meat simultaneously.

Other objects of the invention are to provide various improvements in meat-slitting machines which will be more fully hereinafter set forth.

In order to give an understanding of the invention I have illustrated in the drawings a selected embodiment thereof which will now be described after which the novel features will be pointed out in the appended claims.

The apparatus herein shown comprises means for supporting a slice of steak or slice of other meat which is to be slit and two gangs of rotary slitting knives arranged to act successively on the meat as it is moved over the supporting means, each set of knives being constructed to cut sinuous slits in the meat and the two knives having such relative arrangement that the slits cut by the knives of one gang will intersect those cut by the knives of the other gang thereby producing the two sets of intersecting slits.

Such sinuous slits can be secured by arranging the knives at an angle to their axis of rotation.

Figure 8:
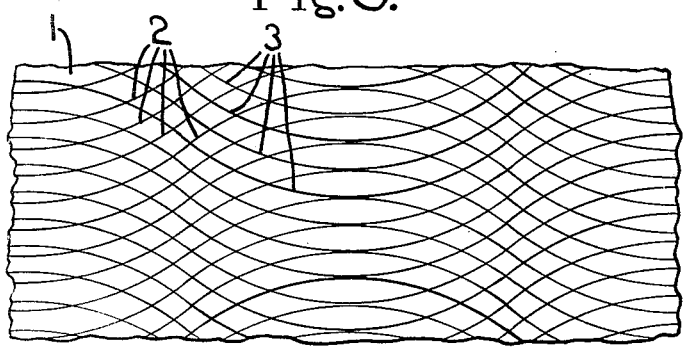
Fig. 8 is a plan view of a piece of meat which has been slit by the improved machine.

Referring first to Fig. 8, 1 indicates a slice of meat which has been provided with slits by an apparatus embodying this invention. This meat is shown as having formed therein two series of sinuous slits 2 and 3, these two series of slits being so arranged that they cross each other.

It will be understood by those familiar with meat-slitting machines that the slits are cut only part way through the meat so that the portions of the meat between intersecting slits are connected by a film of uncut meat. The slitting of the meat in this way increases very greatly the cooking surface and a steak which is thus slit will have a better flavor than one which has not been so treated.

These two series of sinuous slits 2 and 3 are formed by two gangs of rotary disk cutting knives indicated generally at 4 and 5, said knives being preferably arranged so that as the meat is fed forward the two gangs of knives will act on the meat successively. The knives of one gang cut the sinuous slits 2 and those of the other gang the sinuous slits 3. These gangs of knives are shown as supported in a suitable framework which comprises a base member 6 and posts or uprights 7, 8 in which the gangs of knives 4 and 5 are rotatively mounted. The knives of the gang 4 are indicated at 9 and those of the gang 5 at 10.

Each gang of knives is mounted on a shaft, the shaft for the gang 4 being indicated at 11 and that for the gang of knives 5 being indicated at 12. These shafts are rotatively carried by the posts or uprights 7, 8 and may be driven in any suitable way as will be presently described.

The sinuous shape of the slits 2 and 3 is provided by placing the disk knives of each gang at an angle to the axis of rotation.

Figure 7:
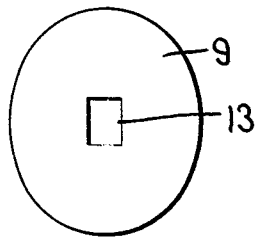
Fig. 7 is a view showing the shape of each of the disk knives.

Each shaft is shown as flat sided or non-circular and each knife, which will have the general elliptical shape shown in Fig. 7, is provided with an oblong opening 13 through which the shaft extends.

The individual knives of the gang are separated at proper distances by means of collars 14 which are mounted on the shaft and at each end of the shaft there is a sleeve 15 having an inclined surface 16 which bears against the outside knife. These sleeves are clamped against the knives and the knives are clamped firmly together on the shaft by means of clamping nuts 17 which are screw threaded to the shaft. With this construction the knives will be rigidly mounted on the shaft so as to rotate therewith and will be held in their inclined position as shown.

Suitable means are provided for supporting the slice 1 of meat while it is being acted on the knives. The device shown in Fig. 1 comprises a receiving table or platform 18 at the receiving end of the machine, a delivery platform 19 at the opposite end of the machine and onto which the slitted meat is delivered, and if desired, an intermediate platform 20 between the two gangs 4 and 5 of knives to support the meat while it is passing from one set of knives to the other.

The meat may be fed along the platforms in any appropriate way and as the slice of meat passes under the first gang of knives one series of slits, such for instance, as the series 2, will be cut in the meat and as the slice continues and moves under the second gang of knives the other series of slits 3 will be cut in the meat, the slits of the two series crossing each other as shown in Fig. 8.

The platforms 18 and 19 are herein illustrated as carried by posts or supports 21 which are secured to the base 6 and the intermediate platform 20 may be carried by two posts 22 also secured to and rising from the base 6.

Where a single pair of tandem arranged gangs of knives are used as above described the two series of slits will be cut in one surface only of the steak. If it is desired to slit both sides of the steak then I may employ a second pair of gangs of slitting knives situated beneath the gangs 4 and 5 so that the meat will pass between two opposed sets of slitting knives. This is the construction shown in Fig. 1 wherein there is illustrated a pair of lower gangs of knives indicated at 23, 24. The gang of knives 23 is situated beneath the gang 4 and the other gang 24 is situated beneath the upper gang 5. The knives of the lower gangs 23, 24 are constructed as above described. Each gang of knives is mounted on a shaft 25 which is preferably non-circular in cross section and the knives of each gang are separated by collars similar to the collars 14 and the knives on each shaft are clamped together firmly by two clamping nuts 17 which are screw threaded to the shaft, said nuts bearing against sleeves 15 having the inclined faces 16 as above described.

Figure 1:
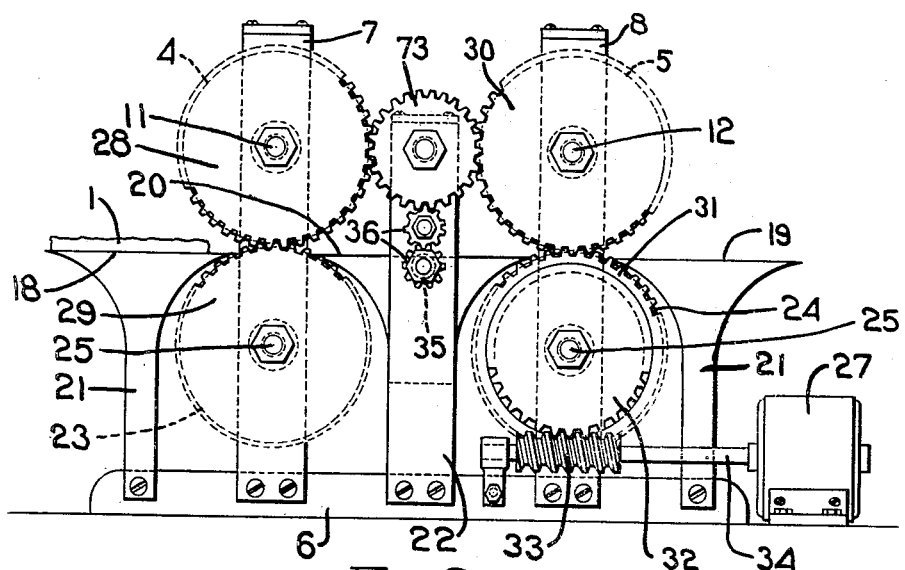
Fig. 1 is a side view of a machine embodying my invention.
Figure 2:
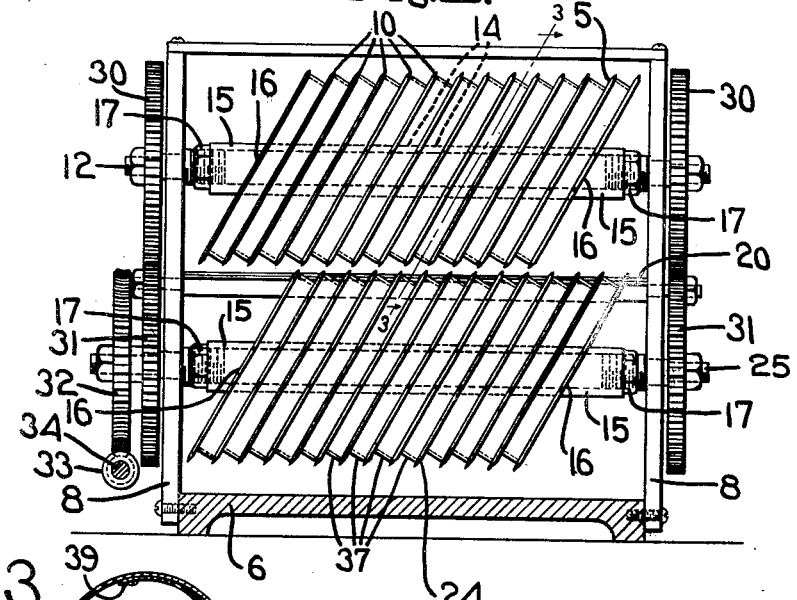
Fig. 2 is an end view thereof.

Any appropriate means may be employed for positively rotating the knives. Where upper and lower knives are employed as herein illustrated the shaft carrying an upper gang of knives will be geared to the corresponding shaft beneath it. As shown in Fig. 1 the shaft of the gang of knives 4 has a gear 28 thereon which meshes with a gear 29 on the shaft 25 of the corresponding lower gang of knives 23. Similarly, the shaft 12 for the gang of knives 5 has a gear 30 thereon which meshes with a gear 31 on the shaft 25 of the lower gang of knives 24. The two gears 28 and 30 are connected by an intermediate gear 73 whereby the shafts of the gangs of knives will all be geared together.

Power may be applied to any one of the gears and as herein shown the gear 31 has rigid therewith a worm gear 32 which meshes with and is driven by a worm 33 on the shaft 34 of a motor 27. If desired, a feed roll 35 may be employed in connection with the intermediate platform 20, which roll is supported in the post 22 and is connected by suitable gearing 36 with the gear 73.

Figure 5:
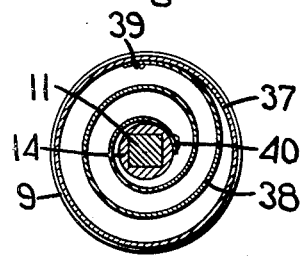
Figs. 5 and 6 are sectional views showing different forms of strippers.

Means are also provided for automatically stripping the meat from the knives as the slitting is accomplished. For this purpose each gang of knives is provided with strippers located between the knives. One form of such stripper is shown in Fig. 5 and it consists of a ring 37 which is carried by a spiral spring 38 which tends normally to keep it properly centered with reference to the shaft. The outer end of this spiral spring is secured to the stripper element as shown at 39 and the inner end is secured to the corresponding collar 14 as shown at 40. This stripper can thus yield radially in any direction and as the meat is passing beneath the knives the stripper will yield upwardly as far as necessary to accommodate the slice of meat but it will tend to force the meat from between the knives and will thus prevent the meat from sticking to the knives.

Figure 3:
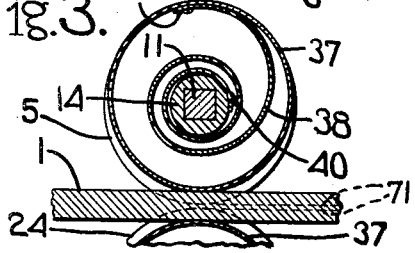
Fig. 3 is a fragmentary section on the line 3—3, Fig. 2.
Figure 4:
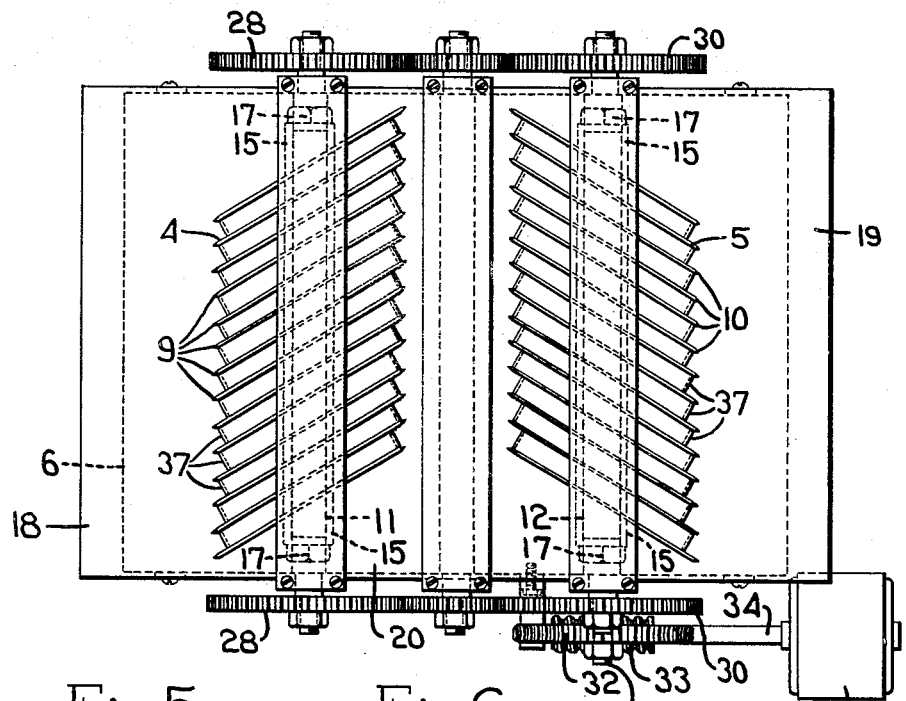
Fig. 4 is a top plan view.

The manner in which this stripper operates is illustrated in Fig. 3 from which it will be seen that the meat has displaced the strippers in a radial direction but each stripper is applying pressure against the meat tending to force it away from the knives.

Figure 6:
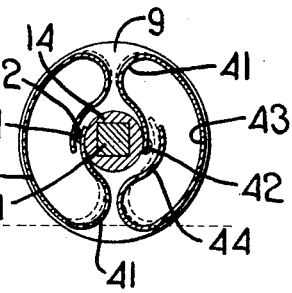

In Fig. 6 I have shown a different form of stripper. This consists of two spring elements 41. Each is secured at its inner end to the collar 14 as shown at 42 and it extends outwardly to the periphery of the knives and then is bent to follow the curvature of the periphery as shown at 43 for nearly 180° and then it is bent inwardly as shown at 44, the end being unattached. There are two such spring fingers between each pair of adjacent knives and these fingers will yield inwardly in a radial direction at any point and will thus function the same way as the ring members 37.

Where the machine is equipped with knives operating on both the upper and lower faces of the meat the action of the strippers will be such as indicated in Fig. 3. As shown in said figure the meat 1 is passing between the upper gang of knives 5 and the lower gang of knives 24, each set of knives cutting slits in the meat, the depth of which are indicated by the dotted lines 71. The action of the strippers 37 on the upper and lower faces of the slice of meat serve not only to strip the meat from the knives but also to center to meat properly with relation to the knives.

Figure 10:
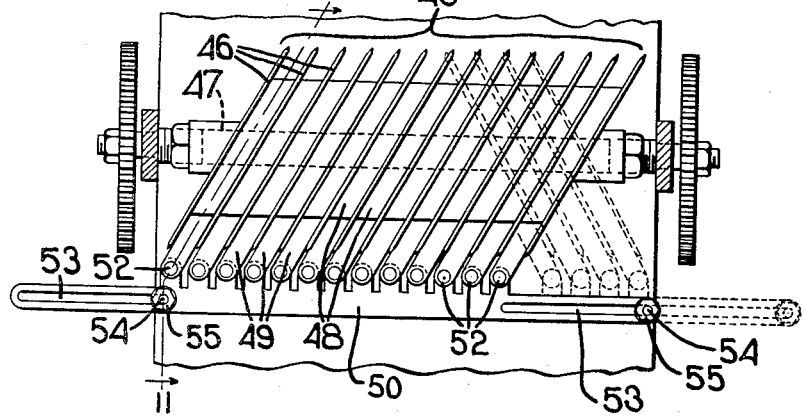
Fig. 10 is a fragmentary view showing one set or gang of knives and illustrating one form of stripper which is different from that shown in Figs. 3, 5 and 6.
Figure 11:
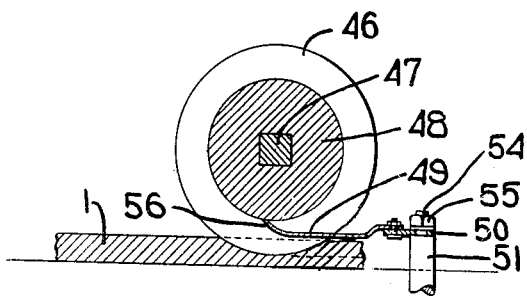
Fig. 11 is a section on the line 11—11, Fig. 10.

In Figs. 10 and 11 I have shown a different form of stripper which may be used in place of the type of stripper that is mounted on and rotates with the shaft. In said Figure 10 there is illustrated a gang of knives 45 similar to the gangs 4 or 5, said gang 45 being formed of a plurality of individual disk knives 46 which are mounted on a shaft 47 and which have an angular relation to the shaft. The knives on the shaft are spaced by collars 48. In this embodiment the means for stripping the meat from the knives comprises a plurality of stripper fingers 49 which are pivotally mounted at 52 on a bar or support 50 that is arranged to slide transversely of the direction of feed of the meat. This bar 50 is shown as supported on posts 51 and as provided with slots 53 through which extensions or reduced ends 54 of the posts extend, the bar being held on the posts by nuts 55. These stripper fingers 49 are situated just above the meat 1 and the ends are preferably bent upwardly slightly as shown at 56 and have engagement with the collars 48.

As the gang 45 of knives is rotated the knives will move from the full to the dotted line position shown in Fig. 10 and during such movement the angular position of the stripper fingers will change and the bar 50 will be shifted transversely from the full to the dotted line position. These fingers 49 and the bar 50 are given their shifting movement by the action of the inclined disk knives.

Figure 9:
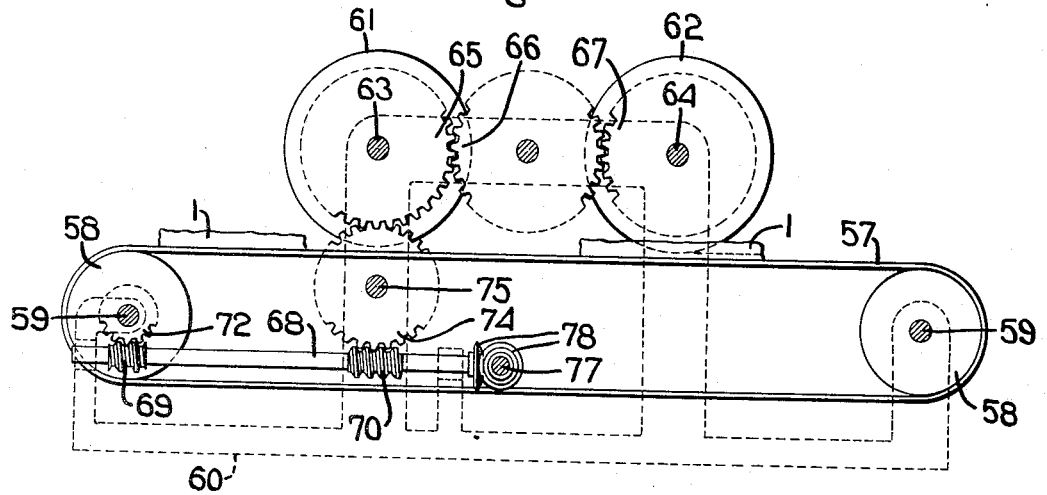
Fig. 9 is a view showing a different embodiment of the invention.

In Fig. 9 and also in Fig. 10 I have illustrated an embodiment of the invention wherein the meat 1 to be slit is fed past the gangs of knives by means of an endless apron or conveyor which is indicated at 57. This conveyor passes around direction pulleys 58 that are carried by shafts 59 that are supported in a suitable frame 60.

The two gangs of rotary knives by which the slits are cut are indicated at 61 and 62, these gangs corresponding to the knife gangs 4 and 5 in Figs. 1 to 4. These gangs of knives are mounted on shafts 63 and 64 which are geared together, the shaft 63 having a gear 65 thereon meshing with an intermediate gear 66 and the latter meshing with a gear 67 on the shaft 64.

Both the knife gangs and the conveyer 57 are shown as being driven from a drive shaft 68, the latter having two worm gears 69 and 70, one of which meshes with a worm gear 72 on the shaft 59 and the other of which meshes with a worm gear 74 on a shaft 75, the latter having a gear 76 thereon which meshes with the gear 65. The power shaft 68 can be driven from any suitable source of power as from a power shaft 77 which is geared to the shaft 68 by suitable gearing 78.

I claim:

1. In a machine for slitting meat, the combination with a shaft, a plurality of disk knives on the shaft, spacers fixed on the shaft between the knives, means to rotate the shaft, and radially-yieldable elements secured to the spacers operating to strip the meat from the knives as they rotate.

2. In a machine for slitting meat, meat-supporting and feeding means, two gangs of rotary disk knives, each knife having an endless continuous cutting edge extending entirely around its periphery and the knives of each gang occupying planes at oblique angles to the axis of revolution, whereby each gang of knives cuts a plurality of sinuous slits in the meat as it is fed forward, and means supporting the knives so that said slits are cut partially but not entirely through the meat, said gangs of knives having a tandem arrangement and being properly spaced from each other so that the sinuous slits cut by the knives of one gang cross those cut by the knives of the other gang.

3. A meat-slitting machine having means to support a slice of meat and feed it forward, two gangs of rotary disk knives spaced from each other in the direction of the feed of the meat, the knives of each gang being arranged in planes at oblique angles to the axis of rotation, and the knives of one gang having an opposite angle of inclination from those of the other gang, each knife having a continuous cutting edge extending entirely around its periphery, and means to rotate the knives as the meat is fed forward, said two gangs of knives being properly spaced so that the sinuous slits cut by the knives of the rearward gang cross the slits cut by the knives of the forward gang.

4. A meat-slitting machine having a gang of rotary disk knives positioned at an angle to the axis of rotation and by which slits are cut in the meat, a rotary shaft on which the knives are mounted, stripper rings situated between adjacent knives and rotating therewith, and a spring connection between each stripper ring and the shaft.

5. A machine for slitting meat having meat-supporting and feeding means, two gangs of rotary disk slitting knives having a tandem arrangement, whereby the gangs of knives act successively on the meat as it is fed forward, the knives of each gang occupying planes at oblique angles to the axis of rotation, stripper rings situated between adjacent knives to strip the meat therefrom, and spring means supporting each stripper ring and yieldingly holding it in place.

JOSEPH P. SPANG.